United States Patent
Shin et al.

(10) Patent No.: US 10,909,853 B2
(45) Date of Patent: Feb. 2, 2021

(54) SYSTEM FOR IDENTIFYING DRIVING INTENTION OF SURROUNDING VEHICLE AND CONTROLLING METHOD THEREOF

(71) Applicants: HYUNDAI MOTOR COMPANY, Seoul (KR); KIA MOTORS CORPORATION, Seoul (KR)

(72) Inventors: Kicheol Shin, Seongnam-si (KR); Youngchul Oh, Seongnam-si (KR); Jinhyuk Choi, Miryang-si (KR); TaeDong Oh, Suwon-si (KR); Wanjae Lee, Suwon-si (KR); Haeryong Lee, Suwon-si (KR); MyungSeon Heo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 286 days.

(21) Appl. No.: 16/012,839

(22) Filed: Jun. 20, 2018

(65) Prior Publication Data

US 2019/0197902 A1    Jun. 27, 2019

(30) Foreign Application Priority Data

Dec. 27, 2017    (KR) .................. 10-2017-0180525

(51) Int. Cl.
*G08G 1/16* (2006.01)
*G06N 5/04* (2006.01)
*B60W 30/09* (2012.01)
*B60W 30/095* (2012.01)
*B60W 10/18* (2012.01)
(Continued)

(52) U.S. Cl.
CPC ............. *G08G 1/166* (2013.01); *B60W 10/18* (2013.01); *B60W 10/20* (2013.01); *B60W 30/09* (2013.01); *B60W 30/0956* (2013.01); *G05D 1/0214* (2013.01); *G06N 5/048* (2013.01);
(Continued)

(58) Field of Classification Search
CPC ...... G08G 1/166; G08G 1/0112; G06N 5/048; B60W 30/09; B60W 30/0956; B60W 10/18; B60W 10/20; B60W 2554/80; B60W 60/0027; B60W 60/0015; B60W 2556/50; B60W 30/18154; B60W 10/184; B60W 2710/20; B60W 2710/18;
(Continued)

(56) References Cited

U.S. PATENT DOCUMENTS

2017/0326981 A1\*  11/2017  Masui ................. G08G 1/166
2018/0286242 A1\*  10/2018  Talamonti ............ B60W 30/14

FOREIGN PATENT DOCUMENTS

| JP | 2008-065480 | \* | 3/2008 |
| JP | 2008-065480 A | | 3/2008 |
| JP | 2009187351 | \* | 8/2009 |

\* cited by examiner

*Primary Examiner* — Muhammad Shafi
(74) *Attorney, Agent, or Firm* — Morgan, Lewis & Bockius LLP

(57) ABSTRACT

A vehicle includes: a navigation device configured to receive position information of the vehicle; a communicator configured to receive a detailed map of a road; a sensor configured to detect an obstacle in the vicinity of the vehicle; and a controller configured to detect at least one adjacent vehicle when the vehicle is located near an intersection, and configured to identify a driving intention of the adjacent vehicle by matching a route of the detected adjacent vehicle with the detailed map of the road.

11 Claims, 13 Drawing Sheets

(51) Int. Cl.
 *G05D 1/02* (2020.01)
 *G08G 1/01* (2006.01)
 *B60W 10/20* (2006.01)
(52) U.S. Cl.
 CPC ....... *G08G 1/0112* (2013.01); *B60W 2554/80* (2020.02); *G05D 2201/0212* (2013.01)
(58) Field of Classification Search
 CPC ........ B60W 2554/801; B60W 2554/00; G05D 1/0214; G05D 2201/0212
 USPC .......................................................... 701/26
 See application file for complete search history.

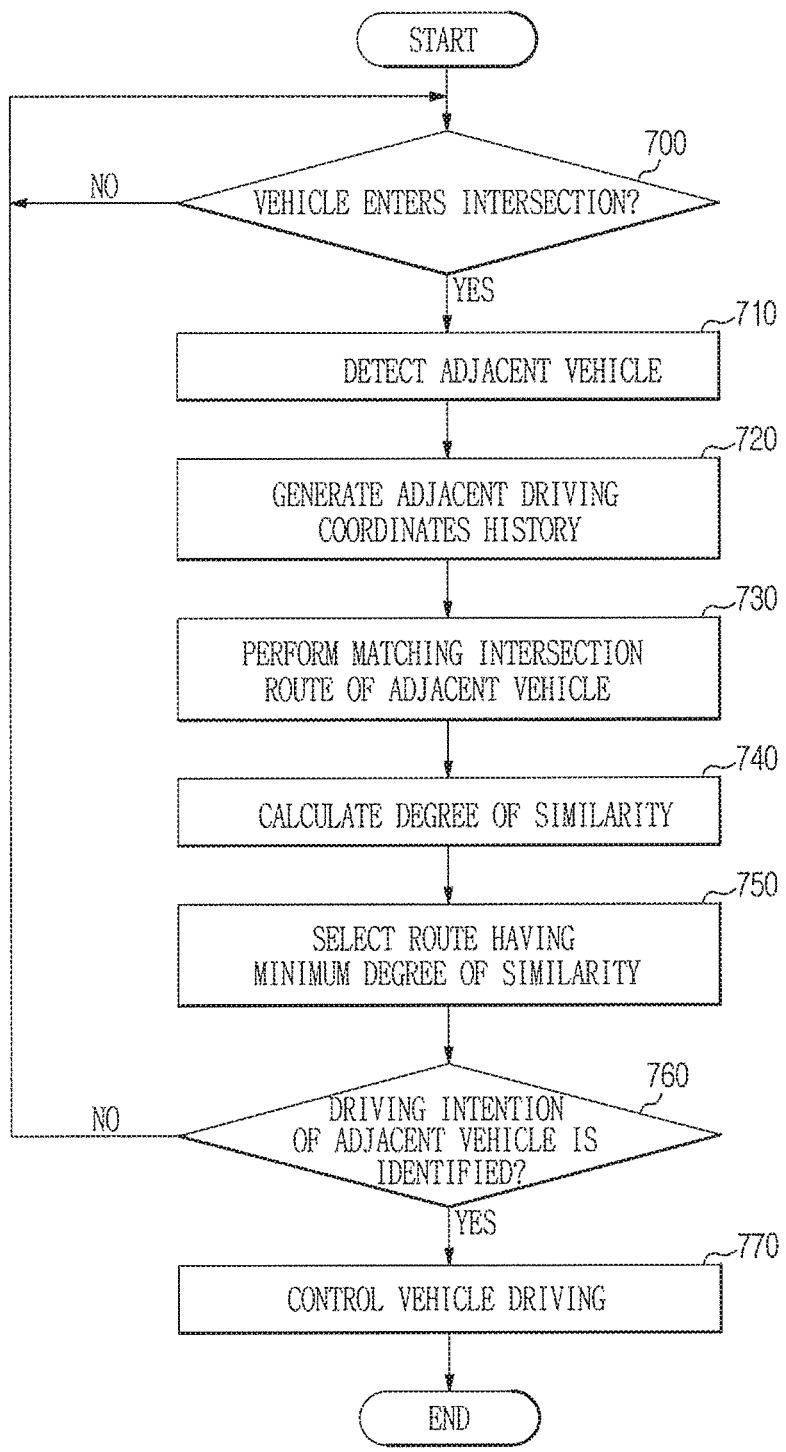

SYSTEM FOR IDENTIFYING DRIVING INTENTION OF SURROUNDING VEHICLE AND CONTROLLING METHOD THEREOF

CROSS-REFERENCE TO RELATED APPLICATION(S)

This application is based on and claims the benefit of priority under 35 U.S.C. § 119 to Korean Patent Application No. 10-2017-0180525, filed on Dec. 27, 2017, in the Korean Intellectual Property Office, the disclosure of which is incorporated by reference herein in its entirety

TECHNICAL FIELD

The present disclosure relates to a vehicle and a control method thereof, more particularly, to a vehicle capable of identifying a driving intention of an adjacent vehicle at an intersection when the vehicle enters the intersection, and a control method thereof.

BACKGROUND

A vehicle represents a variety of apparatuses configured to transport an object, such as people and goods, to a destination. The vehicle may be capable of moving to a variety of locations by using one or more wheels installed in a body of the vehicle. The vehicle may include three-wheeled or four-wheeled vehicles, two-wheeled vehicles, such as motorcycles, construction equipment, bicycles, or trains traveling on the rails disposed on the line.

In modern society, the vehicle has been the most common means of transportation, and the number of people using them has been increased. Due to the development of vehicle technology, there are also advantages, such as ease movement in the long distance and ease of life. However, the traffic congestion has been getting worse due to the deterioration of the road traffic in a high density area.

In recent, vehicles are equipped with a variety of electric components to protect the driver and to provide convenience and fun to the driver. For example, vehicles are equipped with electric components that consume large amounts of power, such as a driving assist system and seat heating wire.

For example, for the convenience and security of the driver, the driving assist system is mounted to the vehicle, wherein the operation of the driving assist system is performed such that the system recognizes a pedestrian in front of vehicle by using a camera and a radar and identifies a risk of collision between the vehicle and the pedestrian by estimating a distance and a relative speed to the pedestrian, and when it is identified that there is the risk of the collision, the system may operate a braking system to avoid the collision.

SUMMARY

An aspect of the present disclosure provides a vehicle, particularly an autonomous vehicle capable of preventing a collision with adjacent vehicles in advance when setting an intersection driving route by identifying an intention of the adjacent vehicles at an intersection.

Additional aspects of the present disclosure will be set forth in part in the description which follows and, in part, will be obvious from the description, or may be learned by practice of the present disclosure.

In accordance with an aspect of the present disclosure, a vehicle includes: a navigation device configured to receive position information of the vehicle; a communicator configured to receive a detailed map of a road; a sensor configured to detect an obstacle in the vicinity of the vehicle; and a controller configured to detect at least one adjacent vehicle when the vehicle is located near an intersection, and configured to identify a driving intention of the adjacent vehicle by matching a route of the detected adjacent vehicle with the detailed map of the road.

The controller may identify a driving intention of the adjacent vehicle by matching at least one driving route from a position in which the adjacent is initially detected, with an actual driving route of the adjacent vehicle.

The controller may calculate a degree of similarity of the at least one route, based on a distance and angle between the at least one route and a unit vector constituting the actual driving route of the adjacent vehicle.

The controller may select a route having the minimum degree of similarity among the calculated degree of similarity on the at least one route, as a driving route of the adjacent vehicle.

The controller may calculate the degree of similarity based on a distance and angle between at least one route segment constituting the at least one route, and at least one time sequential unit vector constituting the actual driving route of the adjacent vehicle.

The controller may identify a case in which the selected driving route of the adjacent vehicle passes through a driving route of the vehicle or a case in which the selected driving route of the adjacent vehicle joins in the driving route of the vehicle, as a dangerous situation.

When it is identified as the dangerous situation, the controller may perform a braking control or a steering control of the vehicle.

When receiving the detailed map of the road, the communicator may acquire a detailed map including information related to lanes at an intersection, and information related to right turn, straight drive or left turn for each lane.

The at least one driving route may comprise a right turn route, a straight drive route or a left turn route at the intersection.

In accordance with another aspect of the present disclosure, a method of controlling a vehicle includes steps of: receiving position information of the vehicle; receiving a detailed map of a road; detecting an obstacle in the vicinity of the vehicle; detecting at least one adjacent vehicle when the vehicle is located near an intersection; and identifying a driving intention of the adjacent vehicle by matching a route of the detected adjacent vehicle with the detailed map of the road.

The step of identifying the driving intention of the adjacent vehicle may comprise: calculating a distance and angle between the at least one route and a unit vector constituting the actual driving route of the adjacent vehicle; and calculating a degree of similarity between the at least one route and the actual driving route of the adjacent vehicle, based on the calculated distance and angle.

The step of identifying the driving intention of the adjacent vehicle may comprise selecting a route having the minimum degree of similarity among the calculated degree of similarity on the at least one route, as a driving route of the adjacent vehicle.

The step of calculating the degree of similarity between the at least one route and the actual driving route of the adjacent vehicle may comprise calculating the degree of similarity based on a distance and angle between at least one route segment constituting the at least one route, and at least one time sequential unit vector constituting the actual driving route of the adjacent vehicle.

The method may further includes a step of identifying a case in which the selected driving route of the adjacent vehicle passes through a driving route of the vehicle or a case in which the selected driving route of the adjacent vehicle joins in the driving route of the vehicle, as a dangerous situation.

The method may further include a step of performing a braking control or a steering control of the vehicle, when it is identified as the dangerous situation.

The step of matching at least one driving route from a position in which the adjacent is initially detected, with an actual driving route of the adjacent vehicle may comprise matching the actual driving route of the adjacent vehicle with a right turn route, a straight drive route or a left turn route at the intersection, wherein the detailed map of the road comprises information related to lanes at the intersection, and information related to right turn, straight drive or left turn for each lane.

BRIEF DESCRIPTION OF THE DRAWINGS

These and/or other aspects of the disclosure will become apparent and more readily appreciated from the following description of embodiments, taken in conjunction with the accompanying drawings.

FIG. 7 is a flowchart illustrating a control method of the vehicle according to an embodiment of the present disclosure.

DETAILED DESCRIPTION

Figure 1:
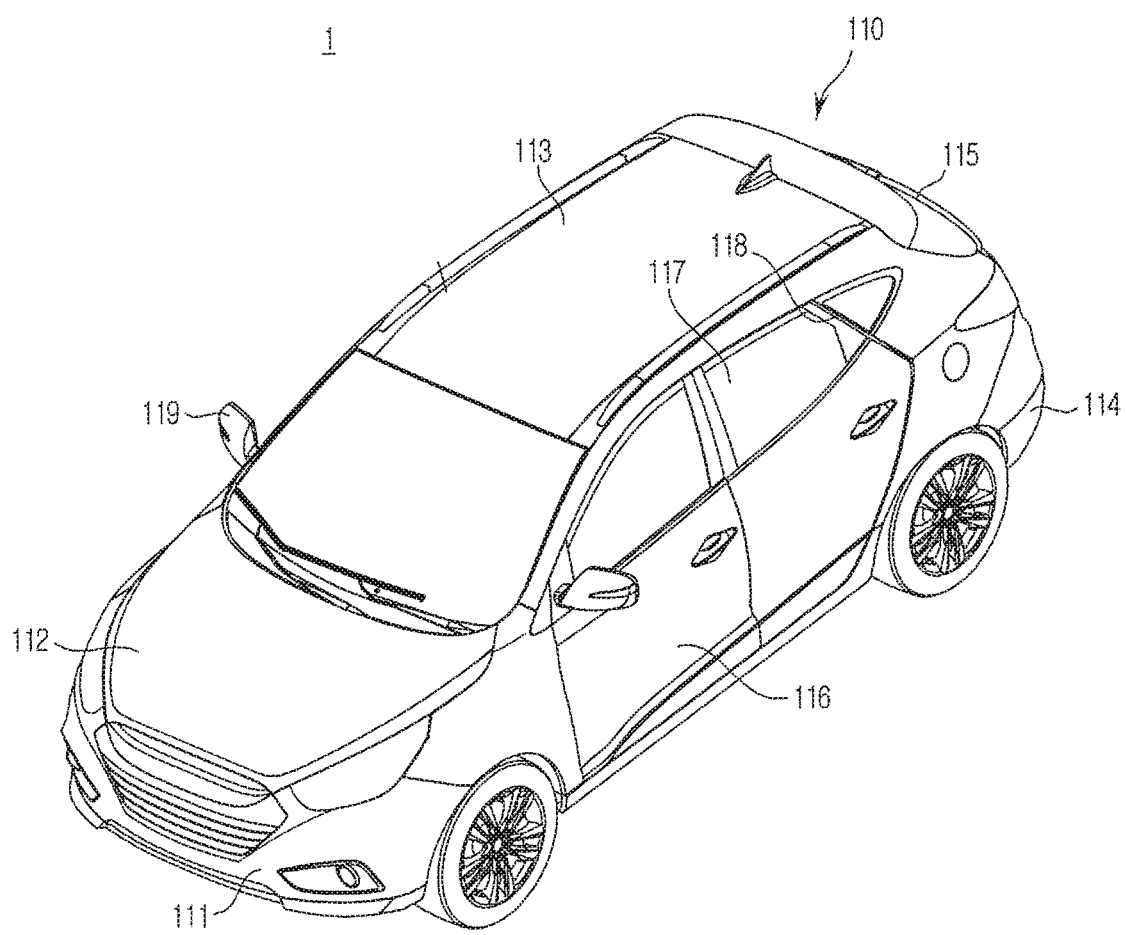
FIG. 1 is a view illustrating an appearance of a vehicle according to an embodiment of the present disclosure.

Like reference numerals refer to like elements throughout the description. Well-known functions or constructions are not described in detail since they would obscure the one or more exemplar embodiments with unnecessary detail. Terms such as "part" and "portion" may be embodied as hardware or software. According to embodiments, a plurality of "part" and "portion" may be implemented as a single component or a single "part" and "portion" may include a plurality of components.

It will be understood that when an element is referred to as being "connected" another element, it can be directly or indirectly connected to the other element, wherein the indirect connection includes "connection via a wireless communication network".

When a part "includes" or "comprises" an element, unless there is a particular description contrary thereto, the part may further include other elements, not excluding the other elements.

As used herein, the singular forms "a" "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Reference will now be made in detail to embodiments of the present disclosure, examples of which are illustrated in the accompanying drawings.

Figure 2:
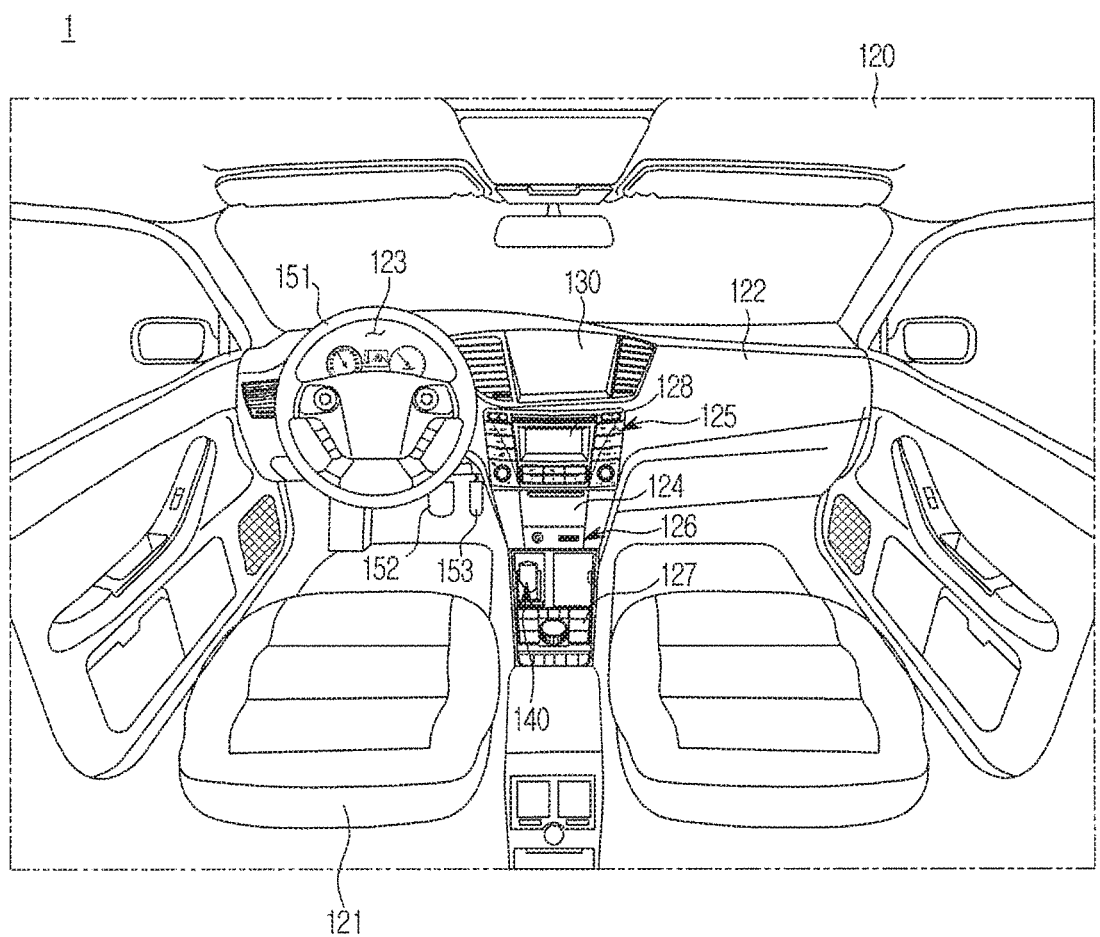
FIG. 2 is a view illustrating an interior of a vehicle according to an embodiment of the present disclosure.

FIG. 1 is a view illustrating an appearance of a vehicle provided with an autonomous driving control unit according to an embodiment of the present disclosure, and FIG. 2 is a view illustrating an interior of the vehicle provided with the autonomous driving control unit according to an embodiment of the present disclosure.

A vehicle 1 may include a body having an interior and an exterior, and a chassis, which is the rest of the vehicle aside from the body, and in which a mechanical apparatus for the driving is installed.

As illustrated in FIG. 1, an exterior 110 of the body may include a front panel 111, a hood 112, a roof panel 113, a rear panel 114, a trunk 115, front, rear, left, and right doors 116, and a window glass 117 provided in each of the front, rear, left, and right door 116 to be openable.

The exterior 110 of the body may further include a pillar 118 provided in the boundary between the front panel 111, the hood 112, the roof panel 113, the rear panel 114, the trunk 115, and window glasses 117 of the front, rear, left, and right doors 116, and a side mirror 119 configured to provide a view of the rear side of the vehicle 1 to a driver.

As illustrated in FIG. 2, an interior 120 of the body may include a seat 121 on which a passenger is seated, a dashboard 122, an instrument panel that is a cluster, 123, and a center fascia 124 in which an operation panel and an outlet of the air conditioning device, the radio device and the audio device are installed. The instrument panel may be disposed on the dashboard and may include tachometer, speedometer, coolant temperature indicator, fuel indicator, turn signal indicator, high beam indicator light, warning lights, seat belt warning light, trip odometer, odometer, automatic transmission selector lever indicator, door open warning light, oil warning light, and a low fuel warning light.

The cluster 123 may further include a display displaying vehicle driving information and vehicle failure information, The driving information may include fuel mileage information, driving distance information, total mileage information, and driving mode, and the failure information may include tire air pressure abnormality information.

In the center fascia 124, a head unit 125 configured to control a radio device, an audio device, and an air conditioning device, and a multi-terminal 126 may be installed.

The multi-terminal 126 may be disposed adjacent to the head unit 125, and may further include a universal serial bus (USB) port, an auxiliary (AUX) terminal, and a secure digital (SD) slot.

The multi-terminal 126 may be configured to perform communication with a user terminal through the USB port, wherein the user terminal may represent a device that is mobile and communicable such as a smart phone, a lap top, a tablet, and a wearable device.

The vehicle 1 may further include an input 127 configured to receive an operation command of a variety of functions.

The input 127 may be disposed on the head unit 125 and the center fascia 124, and may include at least one physical button such as On/Off button for the variety of functions, and a button to change a set value of the variety of functions.

The input 127 may include a touch panel integrally formed with the display of a vehicle terminal 130. The input 127 may receive position information of button displayed on the display of the vehicle terminal 130.

The input 127 may further include a jog dial or a touch pad to receive a command for moving and selecting a cursor, wherein the cursor is displayed on the display of the vehicle terminal 130.

The jog dial or the touch pad may be provided in the center fascia 124.

The vehicle 1 may further include a display 128 provided in the head unit 125 and configured to display information related to functions that is currently operated, and information input by a user.

The display 128 may be implemented by Plasma Display Penal, Liquid Crystal Display (LCD) panel, Electro Luminescence (EL) panel, Electrophoretic Display (EPD) panel, Electrochromic Display (ECD) panel, Light Emitting Diode (LED) panel or Organic Light Emitting Diode (OLED) panel. The implementation of the display is not limited thereto.

The vehicle terminal 130 may display an image related to the front, rear, left and right sides of the vehicle, and map information and route guidance information by interacting with the navigation mode.

The vehicle terminal 130 may be installed on a dash board to stand or to be embedded on the center fascia 124.

The vehicle terminal 130 may display the information related to functions that is currently operated, and information input by the user.

The vehicle 1 may further include a shift lever 140 provided in the center fascia 124 to receive an operating position, and an electronic parking button (EPB button) disposed around the shift lever 140 or disposed in the head unit 125, and configured to receive an operation command of an electronic parking brake device (not shown).

Therefore, when the shift lever 140 is located near a P-stage and the electronic parking brake device (not shown) is fastened, the vehicle 1 may identify that a driver has a parking intention.

In addition, the vehicle may perform an auto hold function by changing the position of the shift lever. The auto hold function may be configured to hold a vehicle wheel to prevent the vehicle from suddenly driving by maintaining a barking force although a pressure applied to the brake pedal is released when the vehicle is temporarily stopped (e.g., waiting for a signal) in a state in which the shift lever is at a drive stage (D stage). The auto hold function is released when the accelerator pedal is pressed, and the auto hold function applies a braking force to the vehicle wheel to prevent the vehicle from being skidded on a road at a certain or more gradient.

The vehicle 1 may include a steering wheel 151 of a steering system to regulate a driving direction, a brake pedal 152 pressed by a user according to a user braking intention, and an accelerator pedal 153 pressed by the user according to a user accelerating intention.

Figure 3:
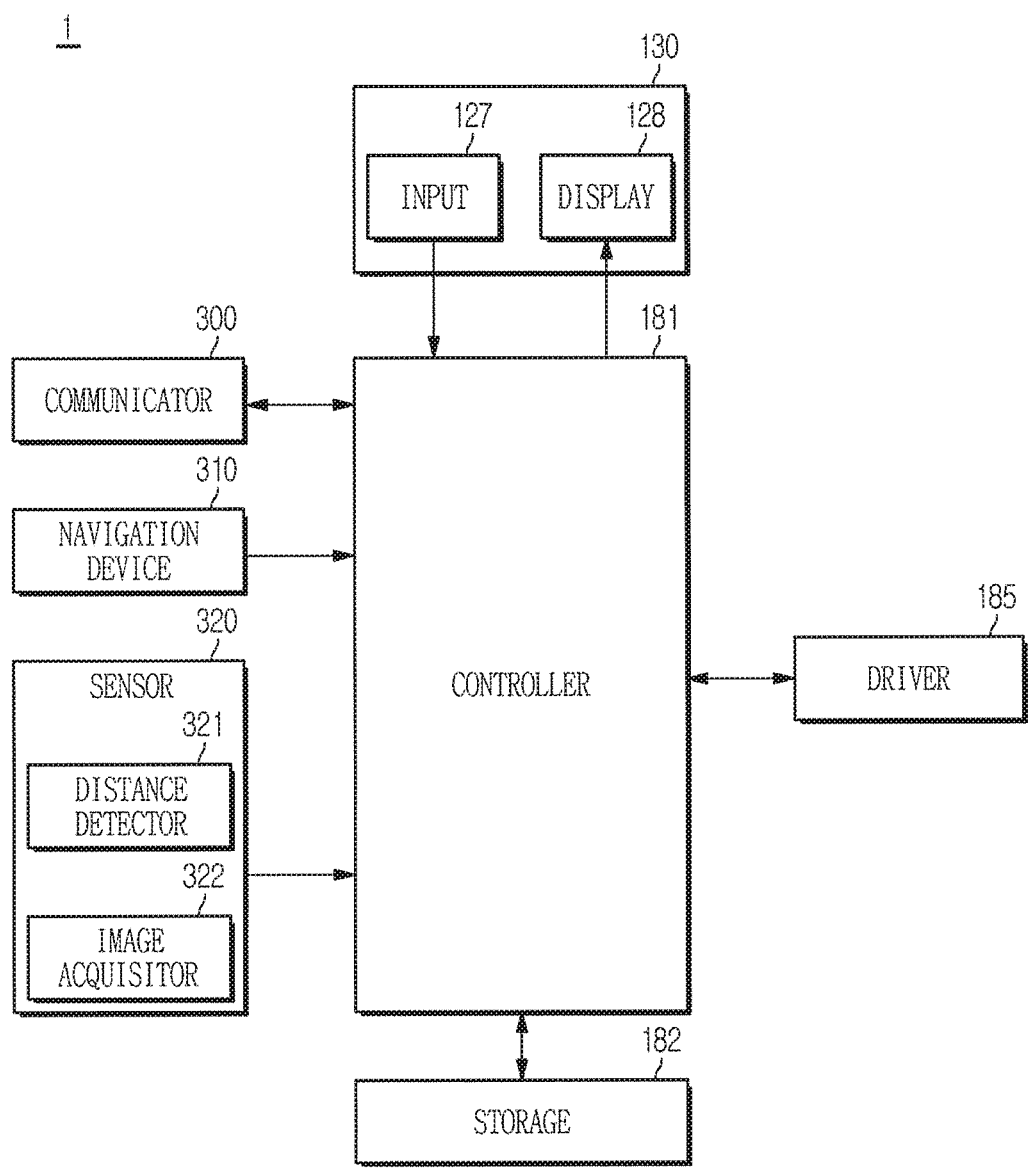
FIG. 3 is an internal block diagram of the vehicle according to an embodiment of the present disclosure.

FIG. 3 is an internal block diagram of the vehicle according to an embodiment of the present disclosure. The vehicle 1 may include a communicator 300 configured to communicate with internal electronics of the vehicle 1, and a plurality of adjacent vehicles in the outside of the vehicle 1, a navigation device 310 configured to obtain position information of the vehicle, a sensor 320 configured to detect obstacle information adjacent to the vehicle, a controller 181 configured to entirely control the vehicle 1, a driver 185 configured to drive the vehicle in response to a control signal of the controller 181, and a storage 182.

The terminal 130 in the vehicle 1 may receive information related to an audio function, a video function, a DMB function, a radio function, a navigation mode and an autonomous driving mode and may display operation information related to a function or a mode that is currently performed in the vehicle.

For example, the terminal 130 in the vehicle 1 may display an image related to the front, rear, left, and right directions detected by the sensor 320.

The terminal 130 may include the input 127 and the display 128. The input of the terminal 130 may be a touch panel and the display of the terminal 130 may be a display panel.

The terminal 130 may be provided as a touch screen in which a touch panel and a display panel are integrally formed with each other.

In addition, the terminal 130 may include the display panel corresponding to the display, and the terminal 130 may receive operation information and an operation command through the input 127 provided in the center fascia. For example, the terminal 130 may receive an estimated parking time from a user through the input 127.

The display 128 of the terminal may display a temperature inside the vehicle during parking of the vehicle.

In addition, the terminal 130 may be configured to perform communication with the controller 181 to control the navigation mode and the autonomous driving mode, and to perform a display operation in response to the control command of the controller 181 received via the communication.

The communicator 300 is a hardware device capable of transmitting an analog or digital signal over wire or wirelessly and may include one or more components configured to allow the communication with an external device, wherein the communicator may include at least one of a short range communication module, a wired communication module, and a wireless communication module. Examples of the communicator 300 include Bluetooth devices, infrared devices, modem, network card (using Ethernet), smartphone, Wi-Fi devices (using a Wi-Fi router), etc. In addition, the communicator 300 may include a control circuit such as an integrated circuit (IC) chip.

Therefore, the vehicle 1 may obtain a detailed map related to the surrounding of the current position of the vehicle by communicating with an external device. The detailed map of the surrounding may represent detailed map information such as lane information including a driving lane, a driving route and a driving direction.

The short-range communication module may include a variety of short range communication modules, which is configured to transmit and receive a signal using a wireless communication module in the short range, e.g., Bluetooth module, Infrared communication module, Radio Frequency Identification (RFID) communication module, Wireless Local Access Network (WLAN) communication module, NFC communications module, and ZigBee communication module.

The wired communication module may include a variety of wired communication module, e.g., Controller Area Network (CAN) communication module, Local Area Network (LAN) module, Wide Area Network (WAN) module, or Value Added Network (VAN) module and a variety of cable communication module, e.g., Universal Serial Bus (USB), High Definition Multimedia Interface (HDMI), Digital Visual Interface (DVI), recommended standard232 (RS-232), or plain old telephone service (POTS).

The wireless communication module may include a wireless communication module supporting a variety of wireless communication methods, e.g., Radio Data System-Traffic Message Channel (RDS-TMC), Digital Multimedia Broadcasting (DMB), Wifi module, Wireless broadband module, global System for Mobile (GSM) Communication, Code Division Multiple Access (CDMA), Wideband Code Division Multiple Access (WCDMA), Time Division Multiple Access (TDMA), and Long Term Evolution (LTE).

The wireless communication module may include a wireless communication interface having an antenna and a receiver that receives traffic information signals. In addition, the wireless communication module may further include a traffic information signal conversion module for demodulating an analog radio signal received via the wireless communication interface, into a digital control signal.

The communicator 300 may further include an internal communication module (not shown) for the communication among the electronic devices in the vehicle 1. The internal communication protocol of the vehicle 1 may include Controller Area Network (CAN), Local Interconnection Network (LIN), FlexRay, or Ethernet.

The navigation device 310 receives position information of the vehicle. The navigation device 310 is a hardware device and may include a Global Positioning System (GPS) receiver calculating the position of the vehicle by communicating with a plurality of satellites.

The sensor 320 may detect an obstacle around the vehicle, and may include a distance detector 321 and an image acquisitor 322.

The distance detector 321 detects a distance from the vehicle 1 to other vehicles and obstacles in the vicinity. The distance detector 321 may be provided on the front, rear, right, and left sides of the exterior of the vehicle, and includes a LiDAR (Light Detection And Ranging) sensor.

The LiDAR sensor corresponds to a non-contact distance detection sensor using the principle of laser radar. The LiDAR sensor may include a transmitter transmitting a laser, and a receiver receiving a laser beam reflected on the surface of an object located near a sensor range. The laser may be a single laser pulse.

The distance detector 321 may include an ultrasonic sensor or a Radio Detection And Ranging (RaDAR) sensor.

The ultrasonic sensor generates ultrasonic waves for a certain time and then detects signals reflected from the object. The ultrasonic sensor may be used to identify the presence of obstacles such as pedestrians within a short range.

The RaDAR sensor is an apparatus that detects the position of an object by using reflected waves generated by the emission of radio waves when transmission and reception are performed in the same place.

In order to prevent a case in which it is difficult to distinguish between transmitted radio wave and received radio wave since the transmitted radio wave and received radio wave are overlapped, the RaDAR sensor may use a Doppler effect or change the frequency of a transmission signal with time or output a pulse wave as a transmission signal.

For reference, in comparison with the RaDAR sensor, the LiDAR sensor has higher detection accuracy in the lateral direction than so as to improve the accuracy of identifying whether a passage is present in front.

Therefore, the distance detector 321 may detect an obstacle around the vehicle 1 based on the detection signals of the LiDAR sensor, the ultrasonic sensor, and the RaDAR sensor.

The image acquisitor 322 may acquire an image of a road, and transmit the acquired image to the controller 181, wherein the image of the road may be an image of a road in a forward direction with respect to a driving direction of the vehicle 1.

The image acquisitor 322 may correspond to a camera, and may include a charge-coupled device (CCD) or a complementary metal oxide semiconductor (CMOS) image sensor.

The image acquisitor 322 may be installed on a window glass on a front side of the vehicle, particularly, on a window glass or a room mirror inside the vehicle. Alternatively, the image acquisitor 322 may be installed on the roof panel 113, particularly, installed to be exposed to the outside. Thus, the image acquisitor 322 may acquire image information related to an obstacle including adjacent vehicles driving in the vicinity of the vehicle 1.

Next, the controller 181 may be installed in the vehicle and perform overall control on a variety of drive devices and additional devices. The controller 181 may be an electronic control unit (ECU) for controlling subsystems in the vehicle, including the vehicle terminal 130, the driver 185, the storage 182, the communicator 300, the navigation device 310, and the sensor 320.

The controller 181 may identify whether the vehicle 1 enters an intersection, and calculate history of coordinates and speed of an adjacent vehicle based on coordinates and a speed of the adjacent vehicle and behavior information of the vehicle 1. The controller 181 may identify a driving intention of the adjacent vehicle by matching the adjacent vehicle information with all routes, which are defined in the map, and control the vehicle 1 based on the identified situation.

First, the controller 181 may identify whether the vehicle 1 enters the intersection. Particularly, the controller 181 acquires the position (GPS) information of the vehicle 1 through the navigation device 310, and identify whether the vehicle 1 enters the intersection based on the detailed map acquired through the communicator 300.

However, although not shown, the controller 181 may acquire route information of the adjacent vehicle by performing a direct wireless communication with the adjacent vehicle through the communicator 300.

Accordingly, the controller 181 may identify the risk of collision by comparing the route of the vehicle 1 with the route information of the adjacent vehicle acquired through the communicator 300.

Figure 4:
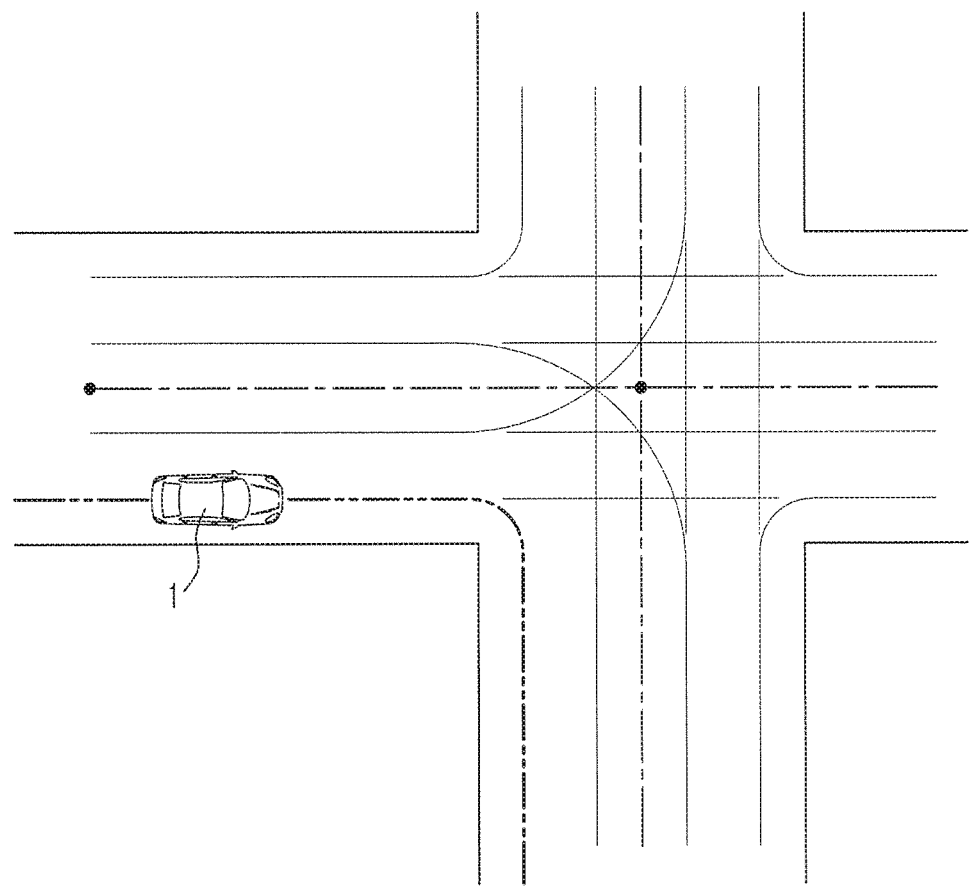
FIG. 4 is a schematic diagram illustrating a detailed map of an intersection and a driving route of the vehicle according to an embodiment of the present disclosure.

FIG. 4 is a schematic diagram illustrating a detailed map of an intersection and a driving route of the vehicle, wherein a two-dot chain line represents a driving route during the autonomous driving mode of the vehicle 1, a solid line represents detailed map information at the intersection acquired through the communicator 300 and an one-dot chain line represents route information defined on the map. Accordingly, the controller 181 may identify whether the current vehicle 1 is located at an intersection through the route information defined on the map, and the detailed map information.

For example, it may be identified that the vehicle 1 shown in FIG. 4 is located in a third line, and in a route driving state, particularly right turn, at the intersection.

When the controller 181 identifies that the vehicle 1 entered the intersection, already, the controller 181 may calculate history of coordinates and speed of an adjacent vehicle based on coordinates and speed of the adjacent vehicle and behavior information of the vehicle 1.

At the intersection, the vehicle 1 may recognize an adjacent vehicle through the sensor 320.

Particularly, the controller 181 may detect an adjacent vehicle based on an image acquired by the image acquisitor 322 and identify position information of the adjacent vehicle by the distance detector 321. In addition, the controller 181 may generate drive coordinates history of the adjacent vehicle by accumulating the behavior information of the vehicle 1 and the position and speed vector information of the adjacent vehicle.

The drive coordinates of the adjacent vehicle and the vehicle 1 may be indicated such that $n_{th}$ drive coordinates is $(x_n, y_n)$ in under the condition that a driving direction is a X-axis and a direction perpendicular to the driving direction is a Y-axis.

Figure 5A:
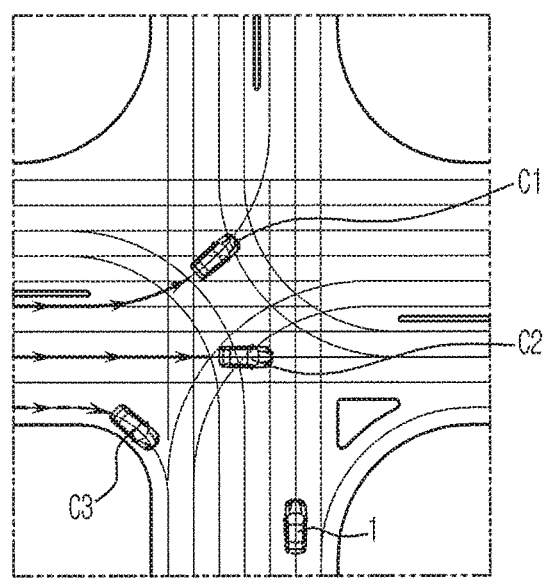
FIGS. 5A to 5D are views illustrating a method for tracking a route and for identifying a driving intention of adjacent vehicles at the intersection according to an embodiment of the present disclosure.
Figure 5B:
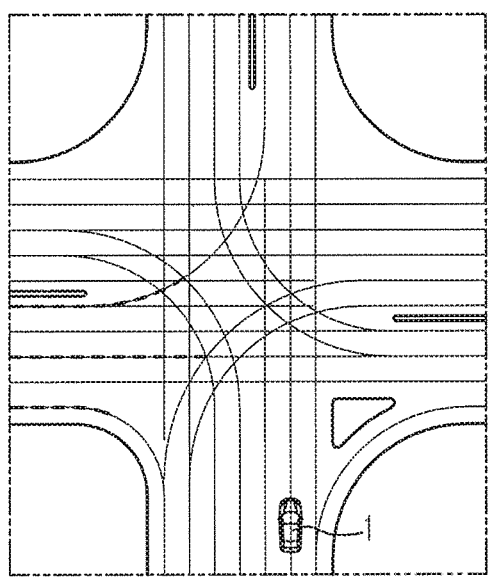
Figure 5C:
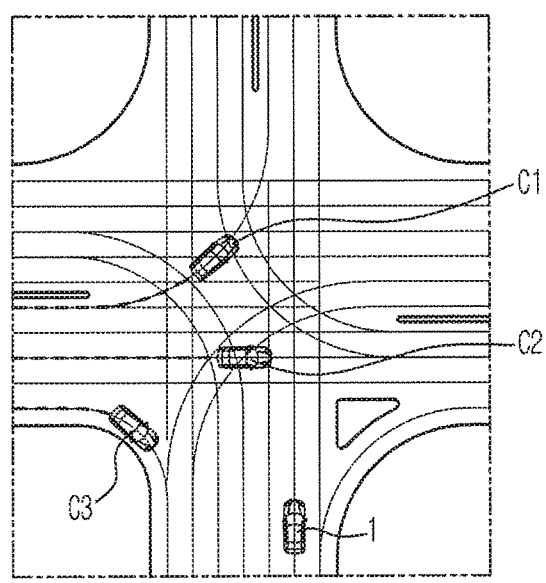
Figure 5D:
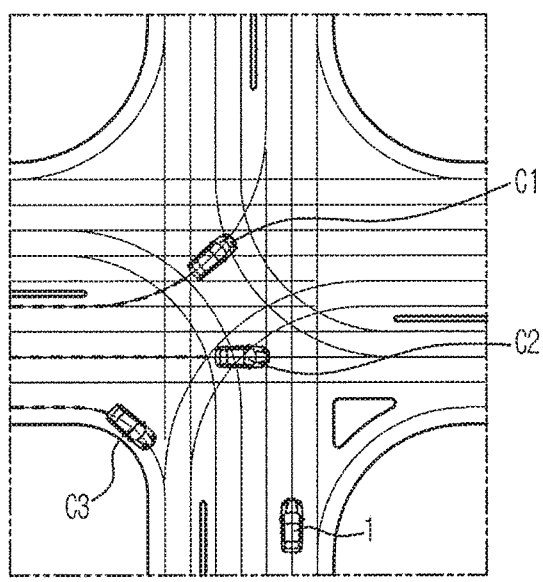

FIGS. 5A to 5D are views illustrating a method for tracking a route and for identifying a driving intention of adjacent vehicles at the intersection. Particularly, 5A is a schematic view illustrating accumulated position and speed vector information of adjacent vehicles C1 to C3, FIG. 5B is a schematic view illustrating a plurality of routes on a detailed map of the intersection, FIG. 5C is a schematic view illustrating a case in which the accumulated position and speed vector information of adjacent vehicles of FIG. 5A is matched with the plurality of routes on the detailed map of the intersection, and FIG. 5D is a schematic view illustrating an estimated route of the adjacent vehicles in the intersection.

As shown in FIG. 5A, the controller 181 may accumulate position and speed vector information of the adjacent vehicles C1 to C3. At this time, the controller 181 may identify a plurality of routes to track the route of the detected adjacent vehicles C1 to C3 in the intersection in which the current vehicle 1 is located.

For example, the controller 181 may identify that the driving route for the adjacent vehicles C1 to C3 is a first to fourth lanes, and the controller 181 may identify that the first lane is a left turn route in the intersection since the first lane is for left turn.

For another example, the controller 181 may identify that the driving routes for the adjacent vehicles C1 to C3 are first to fourth lanes, and the controller 181 may identify that the second lane is a straight drive route in the intersection since the second lane is for driving straight For still another example, the controller 181 may identify that the driving routes for the adjacent vehicles C1 to C3 are the first to fourth lanes, and the controller 181 may identify that the third lane is a straight drive route in the intersection since the third lane is for driving straight or for right turn.

For still another example, the controller 181 may identify that the driving routes for the adjacent vehicles C1 to C3 are the first to fourth lanes, and the controller 181 may identify that the fourth lane is a straight drive route or a right turn route in the intersection since the third lane is for driving straight or for right turn.

As illustrated in FIG. 5C, the controller 181 may match the accumulated history position and speed vector information of adjacent vehicles with the plurality of routes on the detailed map of the intersection.

For example, after the vehicle 1 firstly detects the adjacent vehicle C1 located in the first lane, the vehicle 1 may match accumulated position and speed vector information of the adjacent vehicle C1, with the left turn route of the first lane.

For another example, after the vehicle 1 firstly detects the adjacent vehicle C2 located in the second lane, the vehicle 1 may match accumulated position and speed vector information of the adjacent vehicle C2, with the straight drive route of the second lane.

For still another example, after the vehicle 1 firstly detects the adjacent vehicle C3 located in the fourth lane, the vehicle 1 may match accumulated position and speed vector information of the adjacent vehicle C3, with the straight drive route or the right turn route of the fourth lane.

As illustrated in FIG. 5D, the controller 181 may identify a driving intention of the adjacent vehicles C1 to C3 based on a result of matching between the route and position and speed history of the adjacent vehicle shown in FIG. 5C. That is, the controller 181 may identify that the adjacent vehicle C1 is a left turn vehicle, the adjacent vehicle C2 is a straight vehicle, and the adjacent vehicle C3 is a right turn vehicle.

Therefore, when it is assumed that the vehicle 1 shown in FIG. 5 has a straight drive route, the controller 181 may identify that the adjacent vehicle C1 is a dangerous vehicle since the adjacent vehicle C1 which is identified to have an intention of turning left, may join in the driving route of the vehicle 1.

For another example, when it is assumed that the vehicle 1 shown in FIG. 5 has a straight drive route, the controller 181 may identify that the adjacent vehicle C1 is a dangerous vehicle since the adjacent vehicle C1, which is identified to have an intention of driving straight, may pass through the driving route of the vehicle 1.

However, when it is assumed that the vehicle 1 shown in FIG. 5 has a straight drive route, the controller 181 may identify that the adjacent vehicle C1 is a safe vehicle since the adjacent vehicle C1, which is identified to have an intention of turning right, may does not impact on the driving route of the vehicle 1.

Hereinbefore, the method for identifying whether the adjacent vehicle, which is matched with the lane of the detailed map by the controller 181, is dangerous or safe, has been described.

Hereinafter, a method for matching the lane of the detailed map with the adjacent vehicle by the controller 181 will be described in detail. That is, FIG. 6 is a schematic view illustrating a method for matching the adjacent vehicle at the intersection with the route of the detailed map.

Figure 6A:
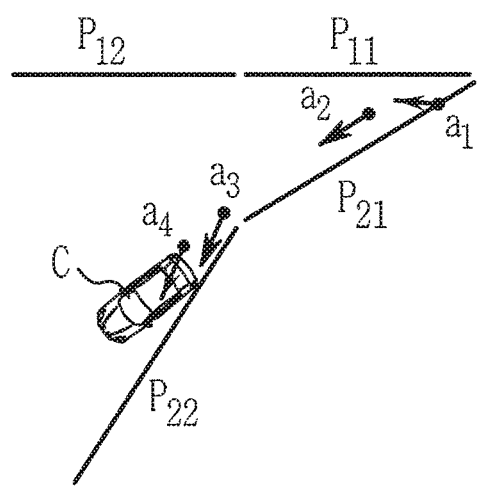
FIGS. 6A to 6D are schematic views illustrating a method for matching the adjacent vehicle at the intersection with the route of the detailed map according to an embodiment of the present disclosure.
Figure 6B:
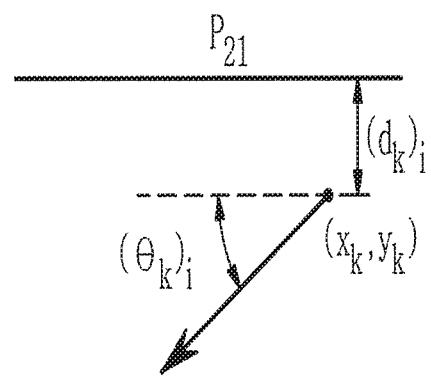
Figure 6C:
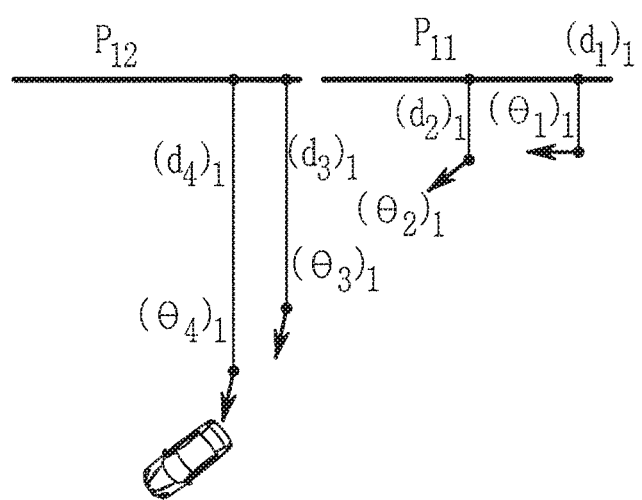
Figure 6D:
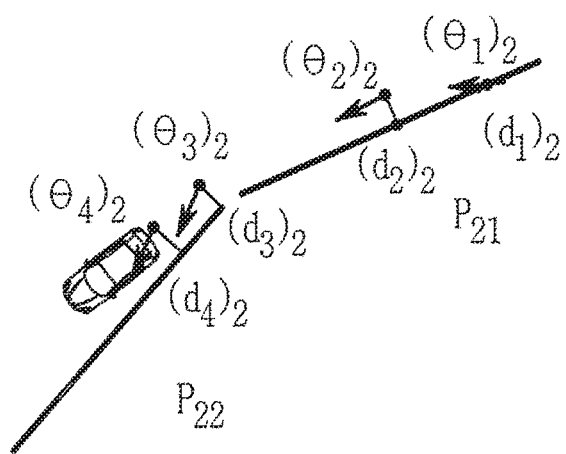

Particularly, FIG. 6A is a schematic view illustrating information related to an available route for an adjacent vehicle detected at the intersection, FIG. 6B is a schematic view illustrating information related to $k_{th}$ distance, speed and angle information in coordinates and speed history of the detected adjacent vehicle, and FIGS. 6C and 6D are schematic views illustrating a method for calculating the degree of similarity by matching the respective routes defined in the intersection.

FIG. 6A is a schematic view illustrating information related to an available route for an adjacent vehicle detected at the intersection. FIG. 6A indicates vector of the detected adjacent vehicle C as an arrow and shows moving direction, speed, and position information of the detected adjacent vehicle C based on vector information related to an initial vector a1 to a current vector a4.

In FIG. 6A, information related to an available route in the initial vector a1 of the adjacent vehicle C is indicated by a thick solid line P1 or P2. The P1 corresponds to a first route, wherein P11 corresponds to a first segment of the first route and P12 corresponds to a second segment of the first route. The P2 corresponds to a second route, wherein P21 corresponds to a first segment of the second route and P22 corresponds to a second segment of the second route. "Segment" represents a unit route indicating each route. In addition, FIG. 6A illustrates two or more segments for each route, but is not limited thereto. For example, $i_{th}$ segment of the second route is indicated by P2$i$.

FIG. 6A illustrates that the driving route information at the initial vector a1 of the adjacent vehicle C is the first route and the second route, but alternatively, there may be only one route or two or more routes.

FIG. 6B is a schematic view illustrating information related to $K_{th}$ distance, speed and angle information in coordinates and speed history of the detected adjacent vehicle, and the controller 181 defines history information of coordinates and speed, and angle.

Particularly, FIG. 6B illustrates $K_{th}$ vector ($a_k$) of the adjacent vehicle with respect to the $i_{th}$ of the second segment P2$i$. Particularly, coordinates of the $K_{th}$ vector ($a_k$) is indicated by ($x_k,y_k$), a distance value between the $K_{th}$ vector ($a_k$) of the adjacent vehicle and the $i_{th}$ of the second segment P2$i$ is indicated by $(d_k)_i$, and an angle between the $K_{th}$ vector ($a_k$) of the adjacent vehicle and the $i_{th}$ of the second segment P2$i$ is indicated by $(\theta_k)_i$. Therefore, the controller 181 may calculate a segment of each route, and a distance and an angle between the segment and the vector, wherein the distance and angle are calculated for each vector.

That is, FIG. 6C is a schematic view illustrating a distance and an angle between the first route, which is among the available routes in the initial vector $a_1$ of the adjacent vehicle C, and the vector. FIG. 6D is a schematic view illustrating a distance and an angle between the second route, which is among the available routes in the initial vector $a_1$ of the adjacent vehicle C, and the vector.

Referring to FIG. 6C, a distance and an angle between the first segment P11 of the first route and coordinates ($x_1,y_1$) of the initial vector $a_1$ are indicated by $(d_1)_1$, and $(\theta_1)_1$, respectively. A distance and an angle between the first segment P11 of the first route and coordinates ($x_2,y_2$) of the second vector $a_2$ are indicated by $(d_2)_1$, and $(\theta_2)_1$, respectively. A distance and an angle between the second segment P12 of the first route and coordinates ($x_3,y_3$) of the third vector $a_3$ are indicated by $(d_3)_1$, and $(\theta_3)_1$, respectively. A distance and an angle between the second segment P12 of the first route and coordinates ($x_4,y_4$) of the fourth vector $a_4$ are indicated by $(d_4)_1$, and $(\theta_4)_1$, respectively.

In the same manner, referring to FIG. 6D, a distance and an angle between the first segment P21 of the second route and coordinates ($x_1,y_1$) of the initial vector $a_1$ are indicated by $(d_1)_2$, and $(\theta_1)_2$, respectively. A distance and an angle between the first segment P21 of the second route and coordinates ($x_2,y_2$) of the second vector $a_2$ are indicated by $(d_2)_2$, and $(\theta_2)_2$, respectively. A distance and an angle between the second segment P22 of the first route and coordinates ($x_3,y_3$) of the third vector as are indicated by $(d_3)_2$, and $(\theta_3)_2$, respectively. A distance and an angle between the second segment P22 of the second route and coordinates ($x_4,y_4$) of the fourth vector $a_4$ are indicated by $(d_4)_2$, and $(\theta_4)_2$, respectively.

At this time, the controller 181 calculates distances and angles based on the segments of the respective routes and the vectors of the adjacent vehicles. Based on the calculated information, the controller 181 calculates a degree of driving similarity between the respective routes and the adjacent vehicles according to an Equation 1.

$$\text{score} = w_2[w_d((d_1)_2+(d_2)_2)+w_\theta(f((\theta_1)_2)+f((\theta_2)_2))]+w_1[w_d((d_3)_1+(d_4)_1)+w_\theta(f((\theta_3)_1)+f((\theta_4)_1))] \quad \text{[Equation 1]}$$

$w_1$ represents a weight for a first segment, $w_2$ represents a weight for a second segment, $w_d$ represents a scale factor for a distance, and $w_\theta$ represents a scale factor for an angle.

In order to calculate the degree of similarity through the trigonometric function about the angle $\theta$ between the segment and the vector, $f(\theta)$ is calculated based on equation 2.

$$f(\theta) = \begin{cases} 1, & |\theta| > \frac{\pi}{2} \\ |\sin(\theta)|, & |\theta| \le \frac{\pi}{2} \end{cases} \quad \text{[Equation 2]}$$

However, the controller 181 may pre-set a weigh so as to increase the weight for the segment including the most recent coordinates when calculating the similarity based on Equation 1.

Therefore, the controller 181 may calculate the degree of similarity for the respective routes based on Equation 1 and Equation 2. That is, the degree of similarity calculated for the first route P1 may be calculated as score 1, and the degree of similarity calculated for the second route P2 may be calculated as score 2.

The controller 181 may compare the degrees of similarity, which are calculated for the respective routes, and select a route having the minimum similarity as a driving route of the adjacent vehicle. For example, when the score 1 is greater than the score 2, the controller 181 may match a route of the adjacent vehicle C with the second route P2 having the score 2.

Therefore, the controller 181 may identify a driving intention of the adjacent vehicle based on the result of matching the routes of the adjacent vehicle by calculating the similarity. For example, in FIG. 6A, when the first route P1 is the straight drive route, and the second route P2 is the left turn route, the controller 181 may identify that the driving intention of the adjacent vehicle C is the left turn route since the score 2 corresponding to the second route P2 is less than the score 1 corresponding to the first route P1.

The controller 181 may be a central processing unit (CPU) or a microprocessor (MCU), and may be a processor.

The controller 181 may be implemented using a memory (not shown) storing an algorithm for controlling an operation of components in the vehicle and data related to programs implementing the algorithm, and a processor (not shown) performing the above mentioned operation using the data stored in the memory. The memory and the processor may be implemented in separate chips, or a single chip.

The storage 182 stores map information, a road name in a map, a road type, a route number of a road, and road position information, stores position information of a preset position, and stores image information of the preset position. In addition, the storage 182 may sequentially store the vector information of the adjacent vehicles.

The storage 182 may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory, a volatile memory element, e.g., a Random Access Memory (RAM), or a storage medium, e.g., a Hard Disk Drive (HDD) and a CD-ROM. The implementation of the storage is not limited thereto. The storage may be a memory implemented in a separate chip from the above-described processor related to the controller, and may be implemented as a single chip with the processor.

The driver 185 is configured to drive the vehicle in response to a control signal of the controller 181, thereby performing acceleration/deceleration control and steering control of the vehicle.

FIG. 7 is a flowchart illustrating a control method of the vehicle.

First, the vehicle 1 identifies whether the vehicle enters an intersection (700). The determination of whether the vehicle enters an intersection may be performed based on position information of the vehicle, which is acquired by the navigation device 310, and the detailed map, which is acquired through the communicator 300.

When it is identified that the vehicle enters an intersection (Yes in S700), the vehicle 1 detects an adjacent vehicle (S710), wherein the vehicle 1 may detect a plurality of vehicles located near the intersection on the detailed map, among adjacent obstacles acquired through the sensor 320.

Accordingly, the controller 181 generates a coordinate history for the detected adjacent vehicle (S720), and matches at least one route of the intersection with the generated history (S730).

That is, the controller 181 calculates the similarity based on the at least one route and the driving history of the adjacent vehicle (S740), and selects a route having the smallest (minimum) similarity among the calculated similarities (S750). Based on the selected route, the controller 181 identifies the driving intention of the adjacent vehicle (S760).

Accordingly, by performing the vehicle drive control according to the identified driving intention (S770), the braking control and the steering control may be performed to prevent collision between the vehicle and the adjacent vehicle.

As is apparent from the above description, according to the proposed vehicle and control method thereof, it may be possible to prevent a collision with adjacent vehicles in advance by identifying an intention of the adjacent vehicles when setting an intersection driving route of an autonomous vehicle.

It may be possible to identify an intention of adjacent vehicles at an intersection and when it is identified that there is no risk of collision with adjacent vehicles, it may be possible to reduce a driving time to a destination by the acceleration driving.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
a navigation device configured to receive position information of the vehicle;
a communicator configured to receive a detailed map of a road;
a sensor configured to detect an obstacle in the vicinity of the vehicle; and
a controller configured to:
detect at least one adjacent vehicle when the vehicle is located near an intersection, and
identify a driving intention of the adjacent vehicle by matching the driving route of the detected adjacent vehicle with the detailed map of the road,
wherein the controller identifies a driving intention of the adjacent vehicle by matching at least one driving route of the adjacent vehicle from a position in which the adjacent vehicle is initially detected with an actual driving route of the adjacent vehicle,
wherein the controller calculates a degree of similarity of the at least one driving route of the adjacent vehicle, based on a distance and an angle between the at least one route and a unit vector constituting the actual driving route of the adjacent vehicle, and
wherein the controller calculates the degree of similarity based on a distance and an angle between at least one driving route segment constituting the at least one driving route, and at least one time sequential unit vector constituting the actual driving route of the adjacent vehicle.

2. The vehicle of claim 1, wherein the controller selects a route having a minimum degree of similarity among the calculated degree of similarity on the at least one driving route, as the driving route of the adjacent vehicle.

3. The vehicle of claim 2, wherein the controller identifies a case in which the selected driving route passes through a driving route of the vehicle or a case in which the selected driving route of the adjacent vehicle joins in the driving route of the vehicle, as a dangerous situation.

4. The vehicle of claim 3, wherein, when the dangerous situation is identified, the controller performs a braking control or a steering control of the vehicle.

5. The vehicle of claim 1 wherein, when receiving the detailed map of the road, the communicator acquires a detailed map including information related to lanes at an intersection, and information related to right turn, straight drive or left turn for each lane.

6. The vehicle of claim 5, wherein the at least one driving route comprises a right turn route, a straight drive route or a left turn route at the intersection.

7. A control method of a vehicle comprising steps of: receiving, by a navigation device, position information of the vehicle; and receiving, by a communicator, a detailed map of a road, wherein the control method, performed by a controller, comprises:
detecting an obstacle in the vicinity of the vehicle;
detecting at least one adjacent vehicle when the vehicle is located near an intersection; and
identifying a driving intention of the adjacent vehicle by matching a route of the detected adjacent vehicle with the detailed map of the road,
wherein the step of identifying a driving intention comprises, performed by the controller:
matching at least one driving route from a position in which the adjacent vehicle is initially detected, with an actual driving route of the adjacent vehicle,
calculating a distance and an angle between the at least one driving route and a unit vector constituting the actual driving route of the adjacent vehicle, and
calculating a degree of similarity between the at least one driving route and the actual driving route of the adjacent vehicle, based on the calculated distance and angle, and
wherein the step of calculating a degree of similarity comprises calculating the degree of similarity by the controller based on a distance and an angle between at least one route segment constituting the at least one driving route, and at least one time sequential unit vector constituting the actual driving route of the adjacent vehicle.

8. The control method of claim 7, wherein the step of identifying a driving intention further comprises selecting a route having a minimum degree of similarity among the calculated degree of similarity on the at least one driving route, as the driving route of the adjacent vehicle.

9. The control method of claim 8, further comprising identifying a case in which the selected driving route passes through a driving route of the vehicle or a case in which the selected driving route of the adjacent vehicle joins in the driving route of the vehicle, as a dangerous situation.

10. The control method of claim 9, further comprising performing a braking control or a steering control of the vehicle, when the dangerous situation is identified.

11. The control method of claim 7, wherein the step of matching at least one driving route comprises matching the actual driving route of the adjacent vehicle with a right turn route, a straight drive route or a left turn route at the intersection, and wherein the detailed map of the road comprises information related to lanes at the intersection, and information related to right turn, straight drive or left turn for each lane.

\* \* \* \* \*